(12) United States Patent
Cruz-Hernandez et al.

(10) Patent No.: US 10,579,146 B2
(45) Date of Patent: Mar. 3, 2020

(54) SYSTEMS AND METHODS FOR MULTI-LEVEL CLOSED LOOP CONTROL OF HAPTIC EFFECTS

(71) Applicant: Immersion Corporation, San Jose, CA (US)

(72) Inventors: Juan Manuel Cruz-Hernandez, Montreal (CA); Danny A. Grant, Laval (CA); Jamal Saboune, Montreal (CA); Christopher J. Ullrich, Ventura, CA (US)

(73) Assignee: Immersion Corporation, San Jose, CA (US)

( * ) Notice: Subject to any disclaimer, the term of this patent is extended or adjusted under 35 U.S.C. 154(b) by 0 days.

(21) Appl. No.: 16/010,131

(22) Filed: Jun. 15, 2018

(65) Prior Publication Data
US 2019/0384393 A1   Dec. 19, 2019

(51) Int. Cl.
*G06F 3/01* (2006.01)
*G06F 3/041* (2006.01)

(52) U.S. Cl.
CPC ............. *G06F 3/016* (2013.01); *G06F 3/041* (2013.01)

(58) Field of Classification Search
CPC ................................. G06F 3/016; G06F 3/041
USPC ................................. 340/407.1, 407.2, 539.1
See application file for complete search history.

(56) References Cited

U.S. PATENT DOCUMENTS

| | | | |
|---|---|---|---|
| 6,680,729 B1 | 1/2004 | Shahoian et al. | |
| 7,154,470 B2 | 12/2006 | Tierling | |
| 7,209,118 B2 | 4/2007 | Shahoian et al. | |
| 7,218,310 B2 | 5/2007 | Tierling et al. | |
| 7,369,115 B2 | 5/2008 | Cruz-Hernandez et al. | |
| 7,639,232 B2 | 12/2009 | Grant et al. | |
| 7,821,493 B2 | 10/2010 | Tierling et al. | |
| 7,843,277 B2 | 11/2010 | Gregorio et al. | |
| 8,156,809 B2 | 4/2012 | Tierling et al. | |
| 8,325,144 B1 | 12/2012 | Tierling et al. | |
| 8,378,965 B2 | 2/2013 | Gregorio et al. | |
| 8,590,379 B2 | 11/2013 | Tierling et al. | |
| 8,610,549 B2 | 12/2013 | Modarres et al. | |

(Continued)

FOREIGN PATENT DOCUMENTS

EP   2179799 A1   4/2010

OTHER PUBLICATIONS

U.S. Appl. No. 15/789,323, filed Oct. 20, 2017, Shah et al.
EP 19180364.2, "Extended European Search Report," dated Oct. 21, 2019, 9 pages.

*Primary Examiner* — Daryl C Pope
(74) *Attorney, Agent, or Firm* — Kilpatrick Townsend & Stockton LLP

(57) ABSTRACT

Systems and methods for multi-level closed loop control of haptic effects are disclosed. One illustrative system for multi-level closed loop control of haptic effects includes a haptic output device configured to output a haptic effect, a sensor configured to sense the output of the haptic output device and generate a sensor signal, and a processor in communication with the sensor. The processor is configured to: receive a reference signal, receive the sensor signal, determine an error based at least in part on the reference signal and the sensor signal, generate a haptic signal based at least in part on the reference signal and the error, and transmit the haptic signal to a haptic output device configured to output a haptic effect based on the haptic signal.

16 Claims, 7 Drawing Sheets

(56) References Cited

U.S. PATENT DOCUMENTS

| | | |
|---|---|---|
| 8,686,839 B2 | 4/2014 | Posamentier |
| 8,791,799 B2 | 7/2014 | Lacroix et al. |
| 8,913,027 B2 | 12/2014 | Modarres et al. |
| 9,411,420 B2 | 8/2016 | Shahoian et al. |
| 9,886,829 B2 | 2/2018 | Levesque |
| 2009/0192634 A1 | 7/2009 | Fujinaka |
| 2011/0077055 A1 | 3/2011 | Pakula et al. |
| 2011/0309918 A1 | 12/2011 | Ramsay |
| 2013/0106589 A1 | 5/2013 | Posamentier |
| 2013/0127755 A1* | 5/2013 | Lynn ................ G08B 6/00 345/173 |
| 2016/0320901 A1* | 11/2016 | Son ................ G06F 3/0416 |

* cited by examiner

SYSTEMS AND METHODS FOR MULTI-LEVEL CLOSED LOOP CONTROL OF HAPTIC EFFECTS

FIELD OF THE INVENTION

The present application relates to the field of haptic effects. More specifically, the present application relates to multi-level closed loop control of haptic effects.

BACKGROUND

Haptic effects improve usability in devices and applications generally, and particularly in mobile and virtual and augmented reality devices and in applications, such as gaming. This has led to an increase in the breadth of implementation of haptics. As haptics is implemented in varied devices, it can be a challenge to ensure high-quality, consistent haptic effects across a range of different devices, and even in different versions or even production runs of the same device. Systems and methods for multi-level closed loop control of haptic effects are needed to help ensure the quality and consistency of such haptic effects.

SUMMARY

In one embodiment, a system comprises a haptic output device configured to output a haptic effect, a sensor configured to sense the output of the haptic output device and generate a sensor signal, and a processor in communication with the sensor. The processor is configured to: receive a reference signal, receive the sensor signal, determine an error based at least in part on the reference signal and the sensor signal, generate a haptic signal based at least in part on the reference signal and the error, and transmit the haptic signal to a haptic output device configured to output a haptic effect based on the haptic signal.

In another embodiment, a method for multi-level closed loop control of haptic effects comprises receiving a sensor signal from a sensor, the sensor configured to sense the output of a haptic output device, receiving a reference signal, and determining an error between the sensor signal and the reference signal. The method further comprises generating a haptic signal based at least in part on the reference signal and the error, and transmitting the haptic signal to a haptic output device configured to output a haptic effect based on the haptic signal. In another embodiment, a computer readable medium may comprise program code, which when executed by a processor is configured to enable the above described method.

These illustrative embodiments are mentioned not to limit or define the limits of the present subject matter, but to provide examples to aid understanding thereof. Illustrative embodiments are discussed in the Detailed Description, and further description is provided there. Advantages offered by various embodiments may be further understood by examining this specification and/or by practicing one or more embodiments of the claimed subject matter.

BRIEF DESCRIPTION OF THE DRAWINGS

A full and enabling disclosure is set forth more particularly in the remainder of the specification. The specification makes reference to the following appended figures.

DETAILED DESCRIPTION

Figure 1:
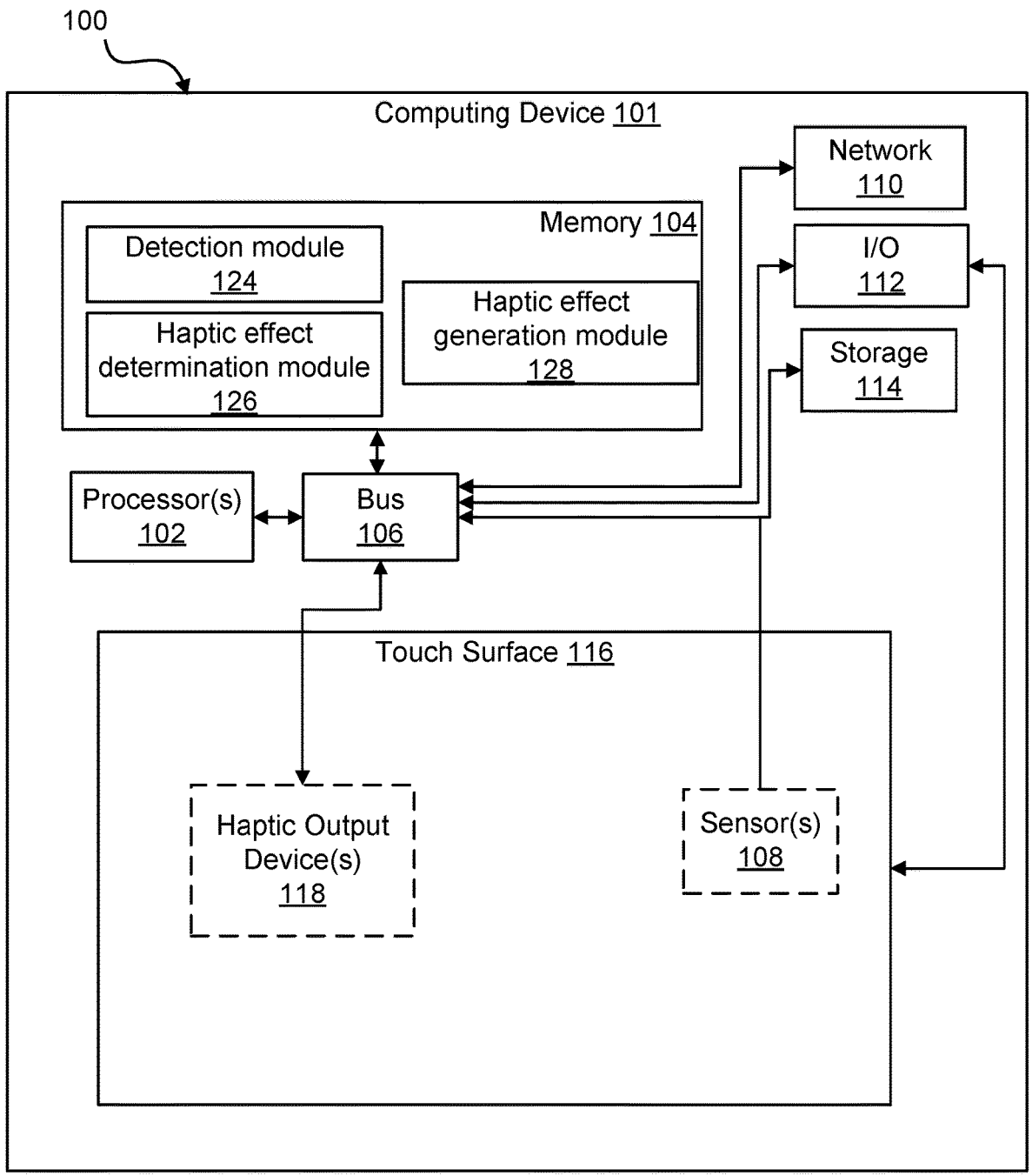
FIG. 1 shows an illustrative system for multi-level closed loop control of haptic effects in one embodiment.

Reference will now be made in detail to various and alternative illustrative embodiments and to the accompanying drawings. Each example is provided by way of explanation, and not as a limitation. It will be apparent to those skilled in the art that modifications and variations can be made. For instance, features illustrated or described as part of one embodiment may be used in another embodiment to yield a still further embodiment. Thus, it is intended that this disclosure include modifications and variations as come within the scope of the appended claims and their equivalents.

Illustrative Example System for Multi-Level Closed Loop Control of Haptic Effects In one illustrative embodiment, a mobile application executing on a mobile device, such as a smart phone, enables a user to perform a variety of tasks. The mobile application includes an interface that provides the user with user interface elements, such as virtual buttons. When the user touches the touch screen of the smart phone at the location of the button, the application executes the function associated with the button.

The user's interaction with the user interface is improved by providing haptic effects in response to the user's actions. For example, when the user presses the virtual button, the mobile device in the illustrative embodiment outputs a crisp click to inform the user that the button press was successful. The mobile phone may utilize a linear resonance actuator (LRA) to provide the haptic feedback. Or the mobile device might use a different type of haptic output device. The differences in actuator may affect the click sensation that the haptic output device is able to provide to the use. Further, different LRA's may output different effects in response to the same signal due to variances in manufacturing, e.g., one LRA may be more responsive than another LRA even though the specifications of the two LRA's are identical. For example, an LRA may output a signal with a long tail, e.g., the LRA may "ring" for a period of time after the effect has been output.

To compensate for these differences, the illustrative embodiment includes a sensor, such as an accelerometer to detect the effect that is output by the haptic output device. A processor receives a reference signal, which corresponds to the signal as the haptic effect designer meant for the haptic effect to be output. For example, if the sensor is detecting an acceleration, then the reference signal is the expected or desired acceleration. The processor then determines a haptic signal to send to the haptic output device, which outputs the haptic effect in response to the haptic signal. The sensor detects the haptic effect and then sends a sensor signal to a comparator, which compares the signal with the reference signal.

Based on the error, the illustrative embodiment can determine how to modify the reference signal to achieve an effect that is more representative of the reference signal. For instance, the illustrative embodiment can increase the gain of the signal to create a stronger effect. Alternatively, the embodiment might utilize a different type of controller, such as a proportional or proportional integral controller to modify the signal that is sent to the haptic output device. In the illustrative embodiment, a combination of varying the gain and type of controller is used to modify the signal that is sent to the haptic output device.

The preceding example is merely illustrative and not meant to limit the claimed invention in any way.

Illustrative Systems for Multi-Level Closed Loop Control of Haptic Effects

FIG. 1 shows an illustrative system 100 for multi-level closed loop control of haptic effects. Particularly, in this example, system 100 comprises a computing device 101 having a processor 102 interfaced with other hardware via bus 106. Device 101 may be any type of device, including for example, a mobile phone or pad, a virtual or augmented reality headset and controls, automotive interface, laptop, or other device. A memory 104, which can comprise any suitable tangible (and non-transitory) computer-readable medium such as RAM, ROM, EEPROM, or the like, embodies program components that configure operation of the computing device. In this example, computing device 101 further includes one or more network interface devices 110, input/output (I/O) interface components 112, and additional storage 114.

Network device 110 can represent one or more of any components that facilitate a network connection. Examples include, but are not limited to, wired interfaces such as Ethernet, USB, IEEE 1394, and/or wireless interfaces such as IEEE 802.11, Bluetooth, or radio interfaces for accessing cellular telephone networks (e.g., transceiver/antenna for accessing a CDMA, GSM, UMTS, or other mobile communications network(s)).

I/O components 112 may be used to facilitate connection to devices such as one or more displays, touch screen displays, keyboards, mice, speakers, microphones, cameras, and/or other hardware used to input data or output data. In an embodiment for use in a virtual or augmented reality environment, I/O components 112 may include handheld VR controllers. Storage 114 represents nonvolatile storage such as magnetic, optical, or other storage media included in device 101.

System 100 further includes a touch surface 116, which, in this example, is integrated into device 101. Touch surface 116 represents any surface that is configured to sense touch input of a user. Touch surface 116 may include a display for displaying interface elements with which a user can interact, such as, for example, one or more buttons.

One or more sensors 108 are configured to detect a touch in a touch area when an object contacts a touch surface and provide appropriate data for use by processor 102. Sensor 108 may also be used to detect the output of the haptic output device 118. Any suitable number, type, or arrangement of sensors can be used. For example, resistive and/or capacitive sensors may be embedded in touch surface 116 and used to determine the location of a touch and other information, such as pressure. As another example, optical sensors with a view of the touch surface may be used to determine the touch position. The sensor 108 for determining the haptic effect that is output may also comprise an accelerometer, Hall Effect sensor, or optical sensor.

In some embodiments, sensor 108, touch surface 116, and I/O components 112 may be integrated into a single component such as a touch screen display. For example, in some embodiments, touch surface 116 and sensor 108 may comprise a touch screen mounted overtop of a display configured to receive a display signal and output an image to the user. Such embodiments might include smart phones or touch pads, such as those used as stand-alone pads or in applications such as vehicles.

In other embodiments, the sensor 108 may comprise an LED detector. For example, in one embodiment, touch surface 116 may comprise an LED finger detector mounted on the side of a display. In some embodiments, the processor 102 is in communication with a single sensor 108, in other embodiments, the processor 102 is in communication with a plurality of sensors 108, for example, a first touch screen and a second touch screen. The sensor 108 is configured to detect user interaction, haptic effects or other actions and, based on the action, transmit sensor signals to processor 102. In some embodiments, sensor 108 may be configured to detect multiple aspects of a user interaction. For example, sensor 108 may detect the speed and pressure of a user interaction and incorporate this information into the interface signal. Similarly, sensor 108 (or multiple sensors 108) may detect multiple properties of an output haptic effect, such as magnitude, direction, frequency, or other properties.

Device 101 further comprises a haptic output device 118. In the example shown in FIG. 1 haptic output device 118 is in communication with processor 102 and is coupled to touch surface 116. The embodiment shown in FIG. 1 comprises a single haptic output device 118. In other embodiments, computing device 101 may comprise a plurality of haptic output devices.

Although a single haptic output device 118 is shown here, embodiments may use multiple haptic output devices of the same or different type to output haptic effects. For example, haptic output device 118 may comprise one or more of, for example, a piezoelectric actuator, an electric motor, an electro-magnetic actuator, a voice coil, a shape memory alloy, an electro-active polymer, a solenoid, an eccentric rotating mass motor (ERM), or a linear resonant actuator (LRA), a low profile haptic actuator, a haptic tape, or a haptic output device configured to output an electrostatic effect, such as an Electrostatic Friction (ESF) actuator. In some embodiments, haptic output device 118 may comprise a plurality of actuators, for example a low profile haptic actuator, a piezoelectric actuator, and an LRA.

Turning to memory 104, exemplary program components 124, 126, and 128 are depicted to illustrate how a device may be configured to determine and output haptic effects. In this example, a detection module 124 configures processor 102 to monitor touch surface 116 via sensor 108 to determine a position of a touch. For example, module 124 may sample sensor 108 in order to track the presence or absence of a touch and, if a touch is present, to track one or more of the location, path, velocity, acceleration, pressure, and/or other characteristics of the touch over time. Alternatively or in addition, detection module 124 may be configured to detect the output from haptic output device 118.

Haptic effect determination module 126 represents a program component that analyzes data regarding the output haptic effect and the reference signal to determine a drive signal to send to the haptic output device 118.

Haptic effect generation module 128 represents programming that causes processor 102 to generate and transmit a haptic signal to haptic output device 118, which causes haptic output device 118 to generate the selected haptic effect. For example, generation module 128 may access stored waveforms or commands to send to haptic output device 118. As another example, haptic effect generation module 128 may receive a desired type of haptic effect and utilize signal processing algorithms to generate an appropriate signal to send to haptic output device 118. As a further example, a desired haptic effect may be indicated along with target coordinates for the texture and an appropriate waveform sent to one or more actuators to generate appropriate displacement of the surface (and/or other device components) to provide the haptic effect. Some embodiments may utilize multiple haptic output devices in concert to simulate a feature. For instance, a variation in texture may be used to simulate crossing a boundary between buttons on an interface while a vibrotactile effect simulates the response when the button is pressed.

Figure 2:
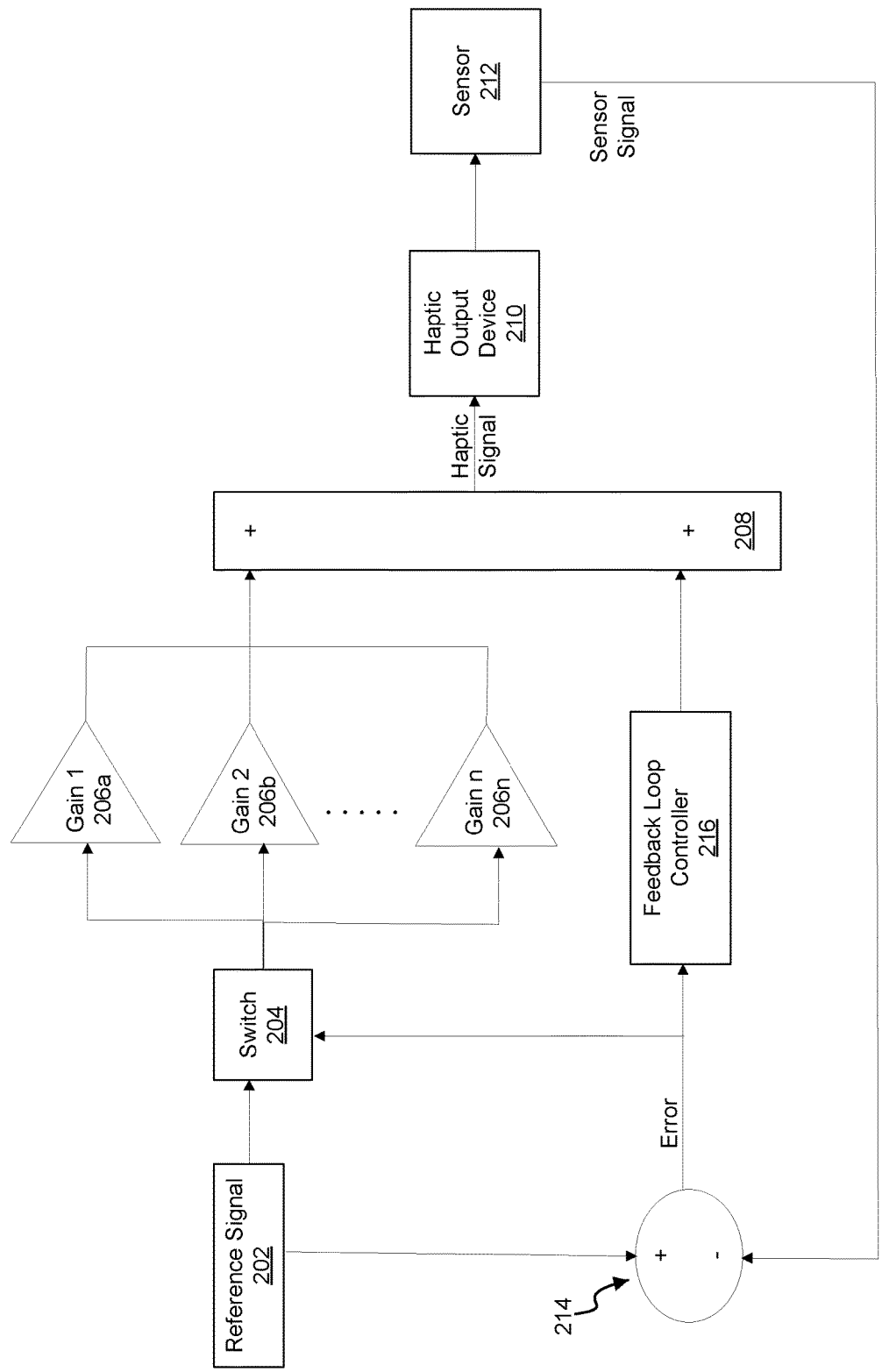
FIG. 2 shows another illustrative system for multi-level closed loop control of haptic effects in one embodiment.

FIG. 2 shows another illustrative system for multi-level closed loop control of haptic effects in one embodiment. In the embodiment shown in FIG. 2, a reference signal 202 is provided to the system. The reference signal 202 represents the haptic effect that a designer wishes to be output by a device. For example, a designer may wish for a virtual button to feel very crisp and mechanical. In another embodiment, a haptic effect designer may wish for a haptic effect to feel vibrato or crunchy. The reference signal 202 reflects the designer's wishes or design choices.

The reference signal is provided to a switch 204. The switch 204 provides the error signal to one of a plurality of amplifiers 206a-n that provide variable gain, Gain 1 through Gain n. Until an initial haptic effect is output, the switch 204 can default to one of the amplifiers, e.g., amplifier outputting "Gain 1" 206a. The reference signal 202 is meant to reflect the desired haptic output. The reference signal 202 includes a variety of properties, including, for example frequency, magnitude, duration, and wave shape. These properties may cause the switch 204 to select a particular amplifier 206. For example, the desired shape versus the actual shape could be used to select the appropriate gain and corresponding amplifier 206. For example, an embodiment might be designed to shorten the tail or an effect. Another embodiment might be designed to manage the rise of the effect, or both the rise and tail of an effect. In another embodiment, the frequency of the reference signal 202 could be used to select the gain. In other embodiments, the switch 204 may be controlled by a control signal rather than by the reference signal 202.

The output of the amplifier 206 is provided to a combiner, such as a summer 208 to generate a haptic or driving signal. The summer 208 transmit the haptic signal to the haptic output device 210. The haptic output device 210 can be any sort of actuator, including for example, an LRA, vibrating actuator, or cantilevered piezo-electric actuator.

The output of the haptic output device 210 is then sensed by a sensor 212. The sensor 212 may comprise various types of sensors and may comprise a plurality of sensors. For example, sensor 212 may comprise a hall effect sensor, a position sensor for sensing movement within the haptic output device 210, an accelerometer, a gyroscope, an optical sensor, such as a camera or infrared sensor, or any other type of sensor or combinations of sensors for detecting the output of the haptic output device and generating sensor signal corresponding to the output haptic effect. While the haptic output device 210 and sensor 212 are shown as separate components, they may be combined in some embodiments.

The sensor signal is provided to a comparator 214 for determining an error between the reference signal 202 and the sensor signal output by the sensor 212. In the embodiment shown, the reference signal 202 and the sensor signal must be of the same type of signal. In other words, the reference signal reflects what the design of the desired haptic feedback effect as it is output from the haptic output device. However, in other embodiments, different types of signals might be used to determine an error. The error is then provided to the switch 204 and to the feedback loop controller 216. The feedback loop controller 216 uses the error to modulate the drive signal.

The feedback loop controller 216 may be of various types. For example, the feedback loop controller 216 might be a proportional-derivative (PD), proportional-integral-derivative (PID), or lead-lag controller. The type of controller might be based on the particular application. For example, a lead-lag controller provides substantial damping and so may be used when a crisp effect is desired. The feedback loop controller 216 may be selected based on the type of reference signal.

Based on the reference signal, switch 204 determines how much gain 1-n should be applied and selects an amplifier 206 based on the determination. In other embodiments, the system may choose an amplifier based on the error or based on a combination of the error, the reference signal, or other inputs. For example, if the error is outside the capability of the feedback loop controller 216, then the system shown in FIG. 2 can use the gain to help correct the error. The gain may also be based on various properties of the reference signal. For example, in one embodiment, the gain is based on the frequency of the reference signal. In such an embodiment, a 400 Hz signal might be directed to amplifier 206a, but a 380 Hz signal might have a somewhat longer tail and therefore be sent to amplifier 206b, which would have a higher gain. The amplifier 206 and feedback loop controller 216 provide signals to the combiner 208 which adds the two signals to determine the final driving to haptic signal provided to the haptic output device 210. In this way, the system shown in FIG. 2 can control the shape (e.g., a sharp effect versus one with a tail), magnitude and duration of a haptic effect while using the same reference signal across a variety of devices.

In some embodiments, the components shown in FIG. 2 may be implemented on a chip. In other embodiments, the components might be implemented as software executing on a mobile device, on a user interface device, such as a virtual or augmented reality controls, or on a gaming computer as examples. In further embodiments, the components may be implemented as a combination of one or more chips and software executing on the device or across multiple devices. Other configurations may also be implemented. For example, in some embodiments, the components may be implemented in an ASIC using a general core with an instruction set. The ASIC might be controlled with parameters. For example, an ASIC might include multiple controllers or a single controller with multiple parameters to control its operation.

Figure 3:
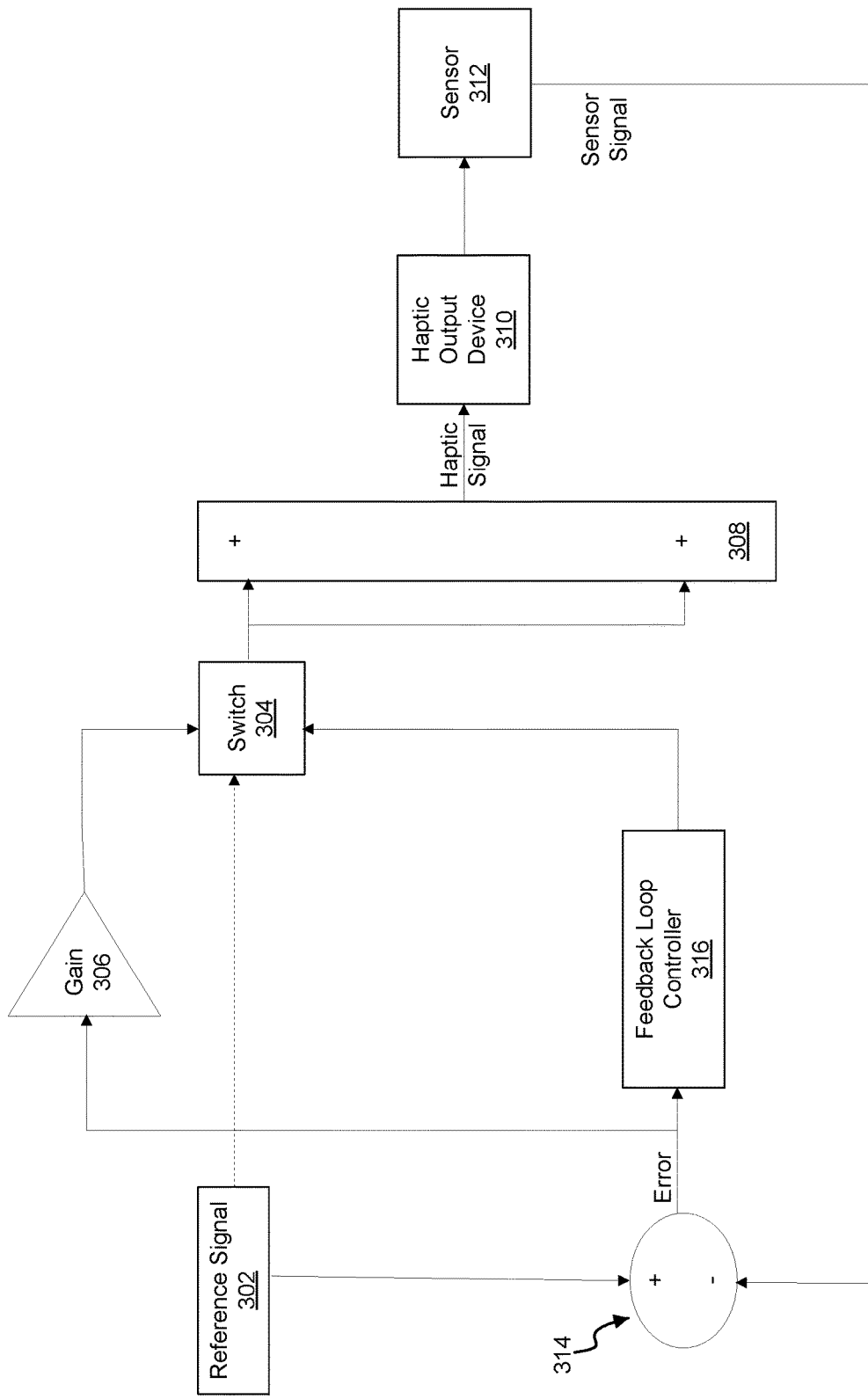
FIG. 3 shows another illustrative system for multi-level closed loop control of haptic effects in one embodiment.

FIG. 3 shows another illustrative system for multi-level closed loop control of haptic effects in one embodiment. FIG. 2 is similar to FIG. 3. However, the reference signal 302 is provided to the switch 304, which can alternatively accept the input from an amplifier 306, a feedback loop controller 316 or both, depending on properties of the reference signal.

As with the system shown in FIG. 2, the combiner 308 provides a haptic signal to the haptic output device 310. A sensor 312 sense senses the output of the haptic output device 310 and provides a sensor signal to a comparator 314. The comparator 314 compares the sensor signal to the reference signal 302 to determine an error to feed to the amplifier 306 and the feedback loop controller 316.

Figure 4:
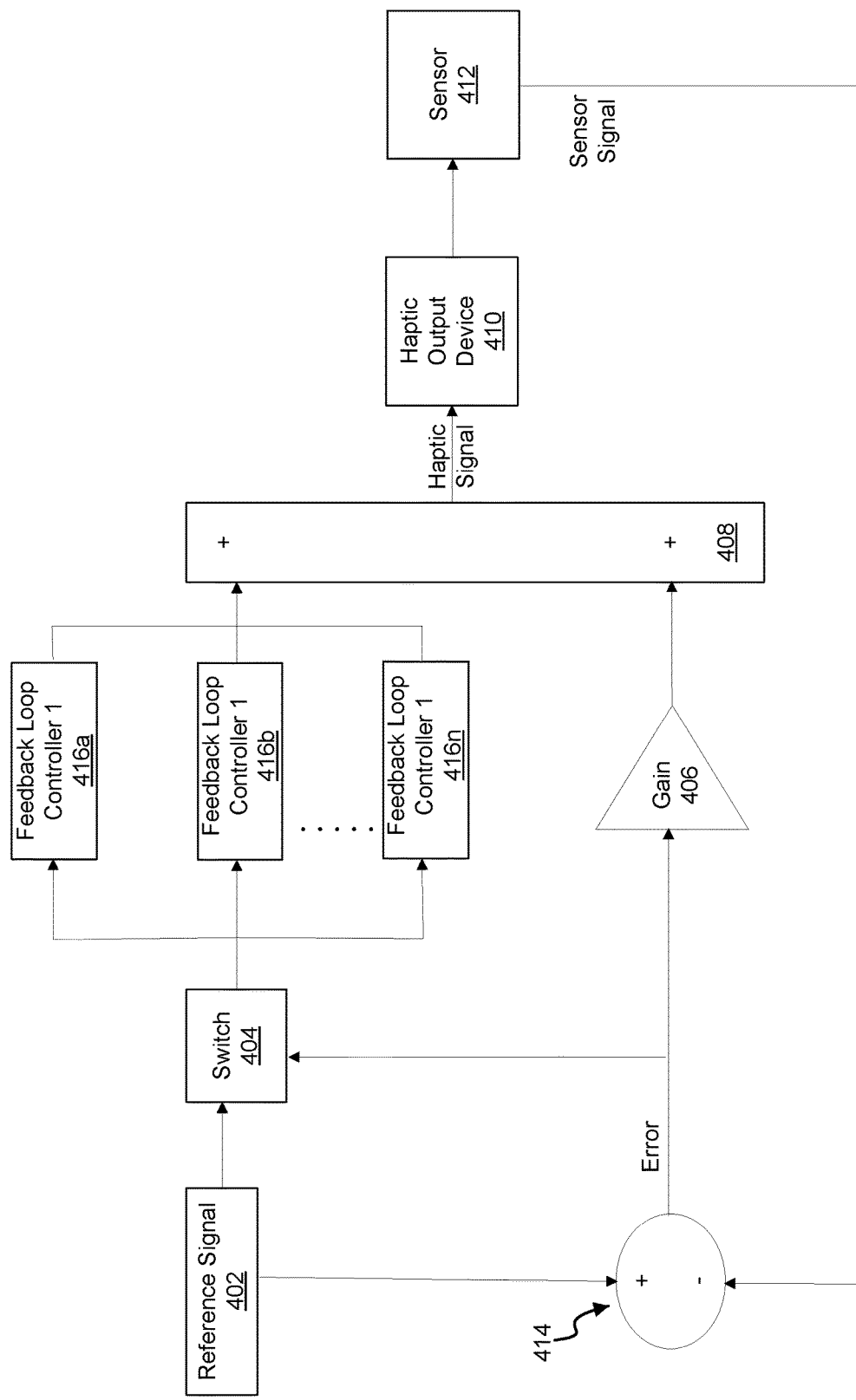
FIG. 4 shows another illustrative system for multi-level closed loop control of haptic effects in one embodiment.

FIG. 4 shows another illustrative system for multi-level closed loop control of haptic effects in one embodiment. As with FIGS. 2 and 3, FIG. 4 includes a reference signal 402. The reference signal is provided to switch 404. Rather than switching between various amplifiers as is shown in FIG. 2, switch 404 switches between various feedback loop controllers 416a-n. In the embodiment shown, feedback loop controller 416a may be a PD controller, while feedback loop controller 416b is a PID controller, and feedback loop controller 416c is a lead-lag controller. As an example, if a haptic output device 410, such as an LRA is overdriven, it often rings for many milliseconds after the power is shut off. In one embodiment when the reference signal returns to 0 (i.e., no haptic effect expected), the controller can drive the actuator to 0. For instance, in one such embodiment, when driving the signal, a PD controller is utilized, but when the reference signal drops to 0, the switch 404 then switches control to a lead-lag controller, which is better able to drive the haptic output device 410 to 0.

Various other combinations and types of controllers may be utilized. The output from the selected feedback loop controller 416 is fed to the combiner, summer 408, which generates a haptic signal and sends it to haptic output device 410.

The sensor 412 senses the output and generates a sensor signal, which is provided to the comparator 414. The comparator 414 provides the error to the switch 404 and an amplifier 406. The amplifier 406 increases the gain of the signal and provides it to the summer 408 to be combined with the signal from the feedback loop controller 416. While the gain is shown as fixed in FIG. 4, additional amplifiers could be utilized to vary the gain. Further, while FIGS. 2, 3, and 4 describe distinct systems, the features of the various embodiments may be combined with one another. For example, one alternative embodiment might include the ability to select from multiple amplifiers 206, 306, 406 and multiple feedback loop controllers 216, 316, 416.

Figure 5:
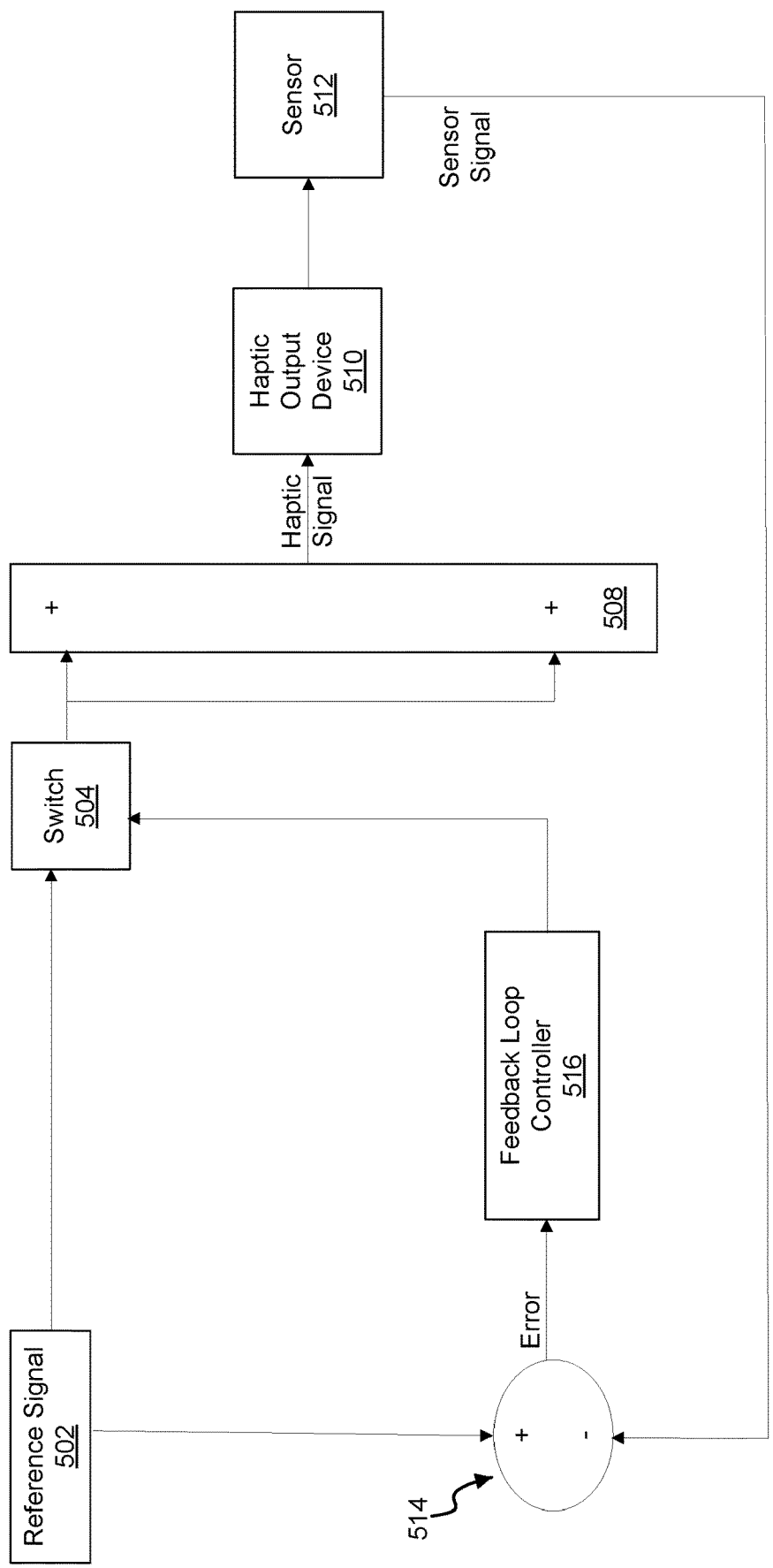
FIG. 5 shows yet another illustrative system for multi-level closed loop control of haptic effects in one embodiment.

FIG. 5 shows yet another illustrative system for multi-level closed loop control of haptic effects in one embodiment. The illustrative system shown in FIG. 5 is similar to the systems shown in FIGS. 2-4 except that the system in FIG. 5 allows for both open and closed-loop control of the haptic signal. In the embodiment shown in FIG. 5, the reference signal 502 is provided to switch 504, which may provide the reference signal 502 directly to the combiner 508. Such an embodiment may be used for switching between open and closed loop control.

For example, in one embodiment, a sensor is not available at all times or using the sensor 512 continuously would not be an efficient use of resources. In such a case, the sensor 512 maybe may be sampled at a certain rate. The switch 504 may select open loop processing while the sensor is not available and then select closed loop processing when the sensor becomes available. The type of control to utilize may also be based on the particular use of the haptic output device 510. For instance, in one embodiment, haptic output device 510 vibrates when a phone is ringing. In such a case, the haptic effect designer may not care about the precision of the effect, and so open-loop processing is used. However, when the same haptic output device 510 is used to indicate that the user has pressed a button on the display of the device, closed-loop processing can be used to ensure a high-quality haptic effect.

Various modifications to the systems shown in these embodiments may be utilized. For instance, some embodiments might include a low pass filter between 508 and 510 in order to smooth out the signal. Such a configuration might be particularly useful when transitioning between open-loop and closed-loop control that might generate some discontinuities in the haptic signal. In one such embodiment, the low pass filter could use a band of 500 Hz, or alternatively, 1000 Hz.

In another embodiment, closed-loop processing is used in an alternating manner to ensure the quality of haptic effects without unduly utilizing resources on the computing device. For instance, in one such embodiment, open-loop processing may be utilized for 20 milliseconds followed by closed-loop processing for 10 milliseconds. In another embodiment in which multiple haptic effects are output in succession, closed-loop processing may be utilized for only the last effect to ensure, for example, that the tail of a haptic effect is dampened. In yet another embodiment, the sensor 512 and controller 516 may operate at different rates such that two samples of the reference signal 502 may be produced for every one sensor signal. Thus, the switch 504 may match frequency with the sensor 512, switching back-and-forth between open- and closed-loop processing.

Figure 6:
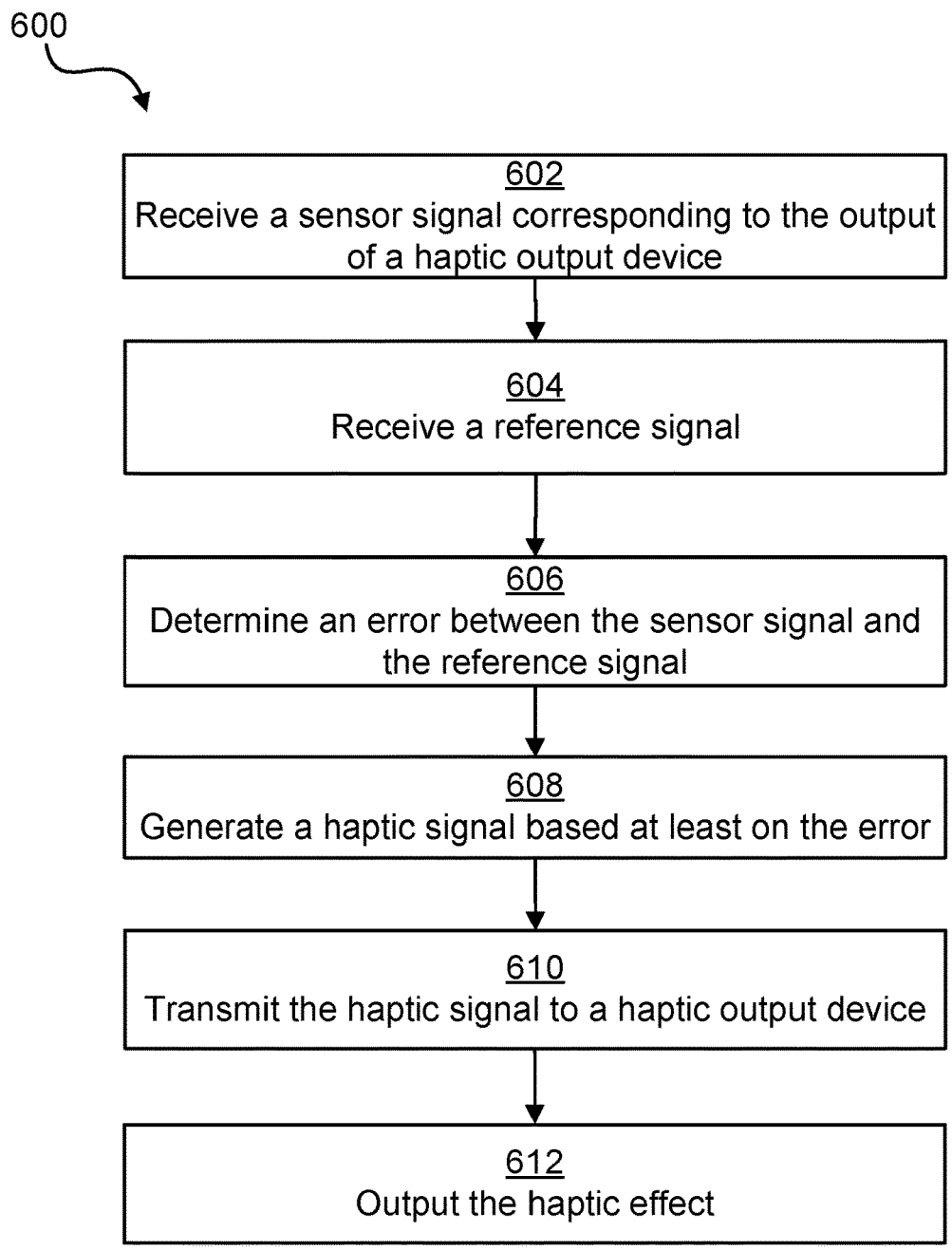
FIG. 6 is a flowchart illustrating a method 600 according to one embodiment. In the embodiment shown, the system.

Illustrative Example Method for Multi-Level Closed Loop Control of Haptic Effects FIG. 6 is a flowchart illustrating a method 600 according to one embodiment. The process shown begins when a processor receives a sensor signal corresponding to the output of a haptic output device 602. The processor also receives a reference signal 604. The reference signal in the embodiment shown is meant to represent a sensor signal that would be generated if a haptic output device accurately created a haptic effect.

The processor then determines an error between the reference signal and the sensor signal 606. For example, the sensor signal and the reference signal may be designed so that the sensor signal should approximate the reference signal. Thus any error, or difference, between the signals indicates that the haptic effect that is output is not accurately reflecting the reference signal.

The processor next generates a haptic effect signal to drive the haptic output device, the haptic effect signal based at least in part on the error 608. For example, the processor may use the determined error to modify the reference signal before outputting a modified drive signal.

The processor next transmits the haptic signal to a haptic output device 610. The haptic output device then outputs the haptic effect 612. The process 600 shown in FIG. 6 may be performed by any of the systems illustrated in FIGS. 1-5 or other systems for performing closed-loop generation of haptic effects.

Figure 7:
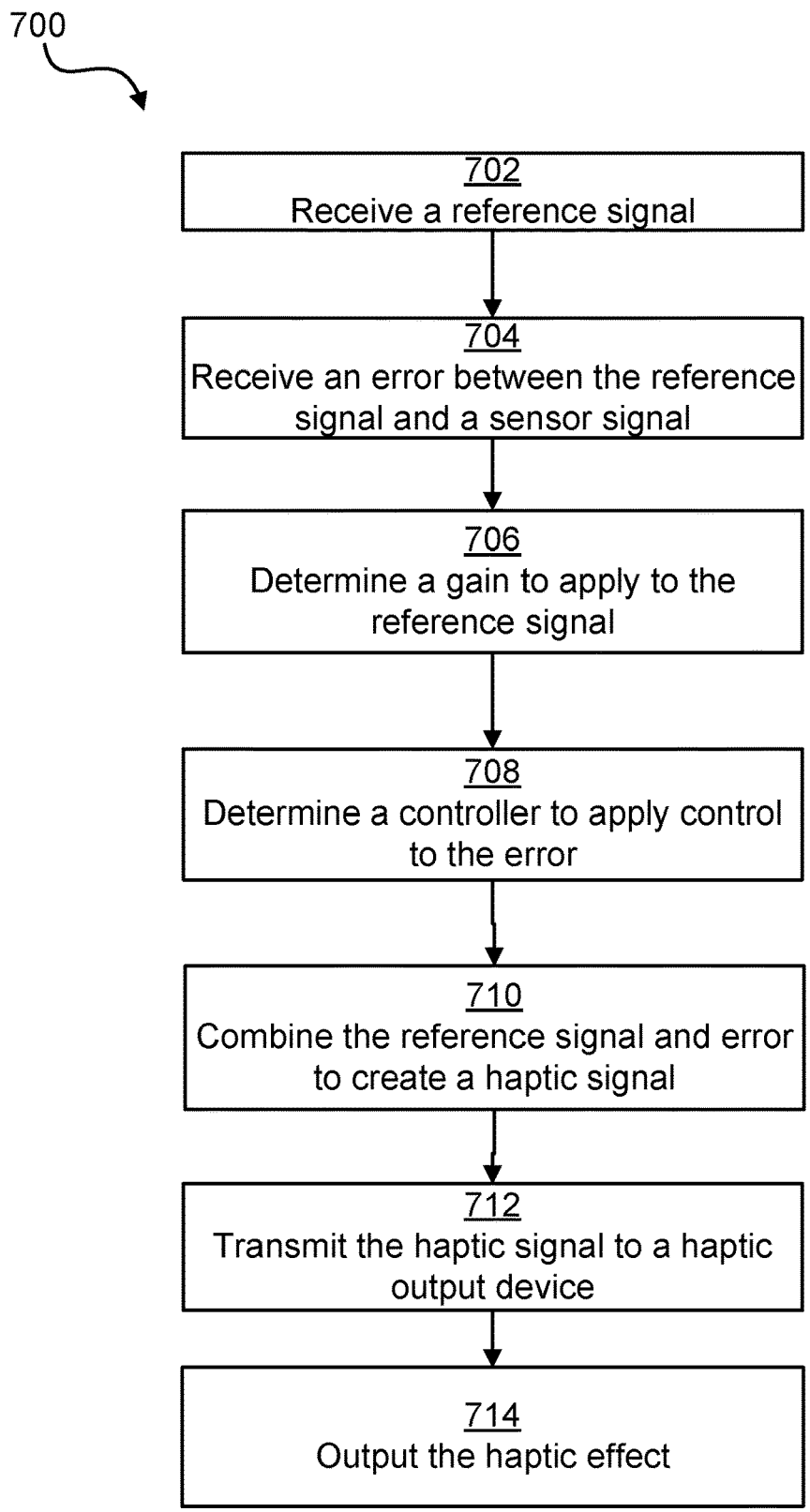
FIG. 7 is a flowchart illustrating another method 700 according to one embodiment.

FIG. 7 is a flowchart illustrating another method 700 according to one embodiment. In the embodiment shown, a processor receives a reference signal 702. The processor also receives an error between the reference signal and a sensor signal 704. The sensor signal is generated by a sensor configured to sense the output of a haptic output device.

In response to the reference signal and the error, the processor determines a gain to be applied to the reference signal 706. For example, the processor may increase or decrease the gain, depending on the reference signal. Alternatively, the processor may determine the gain based on the error or some based on some other control signal.

The processor also determines a controller to apply control to the error based on the error and/or the reference signal 708. For example, the processor may determine that a PD controller might be used for one type of error or reference signal and that a lead-lag controller be used for a different type of reference signal or error.

The processor next combines the reference signal and the error to create a haptic signal 710. As described above, the processor may vary gain or the controller used to create the inputs to the haptic signal to be generated.

The processor then transmits the haptic signal to a haptic output device 712. The haptic output device then outputs the haptic effect 714. A sensor in the device senses some aspect of the haptic effect, such as the acceleration and deceleration or the displacement of the actuator and provides that information to a comparator to determine an error, and the process 700 can begin again.

Embodiments described herein provide numerous advantages over conventional systems for generating haptic effects. For examples, embodiments provide a greater level of consistency in response to a given reference signal across haptic output devices (e.g., actuators) and across devices. Such consistency is useful when haptic output devices are utilized that have lower manufacturing tolerances and thus greater variability. Such haptic output devices are often cheaper than more precise ones. Further, embodiments can help to provide consistency of the intent of the haptic effect designer across multiple devices. As used herein, consistency does not suggest that the effect is precisely the same across devices, but rather, it is more consistent than it would otherwise be.

Further, embodiments can provide improved haptic effects. For instance, a crisper effect may be output on a given actuator when compared to conventional systems. Further, for signals that may lead to unpredictable effects, such as a signal near resonance for a particular device, an embodiment can ensure the desired haptic effect is output. In some embodiments, testing of haptic effects should be simplified since a system can adapt to output the appropriate haptic effect notwithstanding variances in the particular components of individual devices. For example, while the haptic effect actuators in two different mobile phones may have different performance characteristics, an embodiment can adapt without the need to test both devices or implement different effects for each of the devices.

General Considerations

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process that is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered. Accordingly, the above description does not bound the scope of the claims.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

Embodiments in accordance with aspects of the present subject matter can be implemented in digital electronic circuitry, in computer hardware, firmware, software, or in combinations of the preceding. In one embodiment, a computer may comprise a processor or processors. The processor comprises or has access to a computer-readable medium, such as a random access memory (RAM) coupled to the processor. The processor executes computer-executable program instructions stored in memory, such as executing one or more computer programs including a sensor sampling routine, selection routines, and other routines to perform the methods described above.

Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example tangible computer-readable media, that may store instructions that, when executed by the processor, can cause the processor to perform the steps described herein as carried out, or assisted, by a processor. Embodiments of computer-readable media may comprise, but are not limited to, all electronic, optical, magnetic, or other storage devices capable of providing a processor, such as the processor in a web server, with computer-readable instructions. Other examples of media comprise, but are not limited to, a floppy disk, CD-ROM, magnetic disk, memory chip, ROM, RAM, ASIC, configured processor, all optical media, all magnetic tape or other magnetic media, or any other medium from which a computer processor can read. Also, various other devices may include computer-readable media, such as a router, private or public network, or other transmission device. The processor, and the processing, described may be in one or more structures, and may be dispersed through one or more structures. The processor may comprise code for carrying out one or more of the methods (or parts of methods) described herein.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

What is claimed:

1. A method comprising:
    receiving a sensor signal from a sensor, the sensor configured to sense the output of a haptic output device;
    receiving a reference signal;
    determining an error between the sensor signal and the reference signal;
    generating a haptic signal based at least in part on the reference signal and the error, wherein generating the haptic signal comprises selecting a controller based in part on the error, the controller comprising at least one of proportional-derivative controller, a proportional-integral-derivative controller, or a lead-lag controller; and
    transmitting the haptic signal to a haptic output device configured to output a haptic effect based on the haptic signal.

2. The method of claim 1, wherein generating the haptic signal comprises modifying a gain based in part on the reference signal.

3. The method of claim 1, wherein determining the haptic signal further comprises modifying a gain based in part on the error.

4. The method of claim 1, wherein selecting the controller is further based in part on the reference signal.

5. The method of claim 1, wherein the sensor and the haptic output device are contained within a mobile device.

6. The method of claim 1, wherein the haptic output device comprises at least one of linear resonance actuator, piezo-electric, or an eccentric rotating mass.

7. The method of claim 1, wherein the sensor comprises at least one of an accelerometer, a gyroscope, an optical sensor, or a Hall Effect sensor.

8. The method of claim 1, further comprising alternatively (a) generating the haptic signal based at least in part on the reference signal and the error, and (b) generating the haptic signal not based in part on the error.

9. A system comprising:
    a haptic output device configured to output a haptic effect;
    a sensor configured to sense the output of the haptic output device and generate a sensor signal;
    a processor in communication with the sensor, the processor configured to:
        receive a reference signal;
        receive the sensor signal;
        determine an error based at least in part on the reference signal and the sensor signal;
    generate a haptic signal based at least in part on the reference signal and the error wherein generating the haptic signal comprises selecting a controller based in part on the error, the controller comprising at least one of proportional-derivative controller, a proportional-integral-derivative controller, or a lead-lag controller; and
    transmit the haptic signal to a haptic output device configured to output a haptic effect based on the haptic signal.

10. The system of claim 9, wherein the processor is configured to generate the haptic signal by modifying a gain based in part on the reference signal.

11. The system of claim 9, wherein the processor is configured to determine the haptic signal by modifying a gain based in part on the error.

12. The system of claim 9, wherein the processor is configured to select the controller further based in part on the reference signal.

13. The system of claim 9, further comprising a mobile device containing the sensor and the haptic output device.

14. The system of claim 9, wherein the haptic output device comprises at least one of linear resonance actuator, piezo-electric, or an eccentric rotating mass.

15. The system of claim 9, wherein the sensor comprises at least one of an accelerometer, a gyroscope, an optical sensor, or a Hall Effect sensor.

16. A non-transitory computer readable medium comprising program code, which when executed by a processor is configured to cause the processor to:
    receive a sensor signal from a sensor, the sensor configured to sense the output of a haptic output device;
    receive a reference signal;
    determine an error between the sensor signal and the reference signal;
    generate a haptic signal based at least in part on the reference signal and the error wherein generating the haptic signal comprises selecting a controller based in part on the error, the controller comprising at least one of proportional-derivative controller, a proportional-integral-derivative controller, or a lead-lag controller; and
    transmit the haptic signal to a haptic output device configured to output a haptic effect based on the haptic signal.

* * * * *